[11] 3,597,701

| [72] | Inventor | Jean Eugene Martial Cornillault Antony, France |
|---|---|---|
| [21] | Appl. No. | 799,029 |
| [22] | Filed | Feb. 13, 1969 |
| [45] | Patented | Aug. 3, 1971 |
| [73] | Assignee | International Standard Electric Corporation New York, N.Y. |
| [32] | Priority | Feb. 20, 1968 |
| [33] | | France |
| [31] | | 140478 |

[54] MECHANICAL Q-SWITCHING OF LASERS
5 Claims, 4 Drawing Figs.

[52] U.S. Cl.................................................. 331/94.5, 350/96, 350/286
[51] Int. Cl........................................... H01s 3/11, H01s 3/02
[50] Field of Search........................................... 331/94.5; 350/96, 172—183, 286; 356/183

[56] References Cited
UNITED STATES PATENTS

| 1,353,500 | 9/1920 | Spindler | 356/183 |
| 1,643,515 | 9/1927 | Patterson | 356/183 |
| 1,696,739 | 12/1928 | Treleaven | 350/172 |
| 3,434,073 | 3/1969 | Forkner | 350/286 X |
| 3,490,847 | 1/1970 | Berz et al. | 356/74 |

OTHER REFERENCES

Ramsay et al.," Construction Of Single Mode DC Operated He/Ne Lasers" Jap. J. Of App. Phys. 5 (10) Oct. 66, pp. 918-923.

*Primary Examiner*—Ronald L. Wibert
*Assistant Examiner*—R. T. Webster
*Attorneys*—C. Cornell Remsen, Jr., Walter J. Baum, Percy P. Lantzy, Philip M. Bolton, Isidore Togut and Charles L. Johnson ABSTRACT: Apparatus for improving the Q-switching of a laser beam wherein a critical transmission prism is placed in the Fabry-Perot interferometric cavity. In one embodiment, two Lummer-Gehrke plates are joined by their end faces in a V-shape to form said critical transmission prism having an aligned input and output. In a second embodiment, two Lummer-Gehrke plates are joined to a prism to form said critical transmission prism having an aligned input and output.

MECHANICAL Q-SWITCHING OF LASERS

BACKGROUND OF THE INVENTION

The present invention concerns improvements to lasers which are Q-switched by means of a high-speed rotating prism.

It is known that a crystal laser comprises an active element, for instance, a ruby crystal, located in an optical cavity comprising on one side a totally reflecting mirror and on the other side a partially transparent mirror which constitutes the output of the device. The active element receives energy supplied by a pumping light source.

The two mirrors define a Fabry-Perot interferometric cavity inside which the main modes oscillate when the active element is excited by the pumping source.

As this mode of operation produces laser pulses presenting time jitter and whose number and amplitude depend upon the pumping source and its variations, Q-switched operation of the laser under the control of a rotating prism located in the cavity is often utilized.

It is known that such a Q-switched laser produces several pulses as soon as the pumping energy appreciably exceeds the value which constitutes the threshold of laser operation. In some designs, a second pulse appears when the pumping energy is higher by 50 percent than the threshold value. On the contrary, at low temperatures, this margin is reduced (10 to 20 percent above the threshold) which makes the adjustment of the supply very critical.

In various publications, such as the article entitled "An improved method of mechanical Q-switching using total internal reflection," published in the Sept. 196 issue of the Review "Applied Optics" (page 163), it has been shown that this phenomenon is due to the low speed of rotation of the prism which ranges generally between 20,000 and 30,000 revolutions per minute. Because of this low speed, the opening and closing of the cavity is not very fast and this latter has sufficiently low losses so that it may oscillate during several hundredths of nanoseconds. The peak output of the pulse is then limited and several pulses appear, the first one not necessarily being that of highest power.

The production of multiple pulses over a period covering several hundredths of nanoseconds is an extremely troublesome phenomenon when it is required for instance to use the laser for high accuracy range measurements. In fact, a distance of 15 m corresponds to a time interval of 100 ns between the transmission time of the laser pulse and the reception time of the pulse reflected by the object, whereas the possible resolution with a laser beam is much lower.

In order to obtain a single pulse with Q-switching, the spinning speed of the prism may be increased but it is necessary to reach extremely high speeds of about 500,000 revolutions per minute, this requirement leading to the use of an air turbine. This makes a bulky unit reserved as a practical matter for laboratory use.

Another method consists in rendering more critical the optical alignment in the interferometric cavity, for instance by placing therein an element having a transmission (or reflection) factor which is highly dependent upon the angle of the rays, even for very low angle values.

In the above mentioned article, it has been proposed to interpose on the optical path a Lummer-Gehrke plate with multiple reflections where only the rays transmitted between the input and the output faces are used. For a suitable angle of the plate the alignment becomes critical, and it becomes more critical as the number of reflections increases. In other words, the modes slightly inclined with respect to the axis are suppressed, so that the plate is equivalent to a mode filter, the pass band of which, centered on the axial mode, is narrower as the number of reflections increases. Nevertheless, this system is deficient in that it does not enable the use of a cavity in which the input and output are aligned, thereby causing adjustment difficulties in aligning the system. It will be noted that by arranging two identical plates in a suitable manner, one may obtain an alignment of the input with the output, but it then becomes necessary to simultaneously adjust the two prisms (plates) by means of symmetrical movements. The achievement of the adjustment requires a complex and accurate mechanism comprising frames for the plates, spindles and a device for the spacing adjustment.

SUMMARY OF THE INVENTION

In the present invention a two-plate device is achieved, with colinear input and output which does not require any adjustment by joining two plates fixed to a common frame, so that the mode filter constitutes a monoblock assembly, the alignment of which is achieved by construction, and which has only to be positioned accurately in the interferometric cavity.

The object of the present invention is thus to improve the Q-switching of a laser by introducing, in the interferometric cavity, a monoblock and colinear device which assures the transmission of a single pulse at each switching.

The invention is characterized by the fact that said device is constituted by two parallelepipedic plates joined by one of their small faces, in a V-shape so that the input and output faces are perpendicular to the axis of the interferometric cavity, that the slope of the big faces is such that the reflections take place at an angle very slightly higher than the critical angle, that the junction of the two plates is obtained by optical polishing and that the whole assembly is glued on a base plate enabling easy setting.

Another characteristic of the invention is that an alternative for the device is constituted by two parallelepipedic plates joined together by one of their small faces to the small faces of a prism, that the input and output faces of the two plates are at the Brewster angle with respect to the axis of the interferometric cavity, that the slope of the big faces is such as the reflections take place at an angle very slightly higher than the critical angle, that the two plates are joined by means of optical polishing, and that the whole assembly is glued to a base plate enabling easy setting.

The above mentioned and other features and objects of this invention will become apparent by reference to the following description taken in conjunction with the accompanying drawings in which:

DESCRIPTION OF THE PREFERRED EMBODIMENTS

Figure 1:
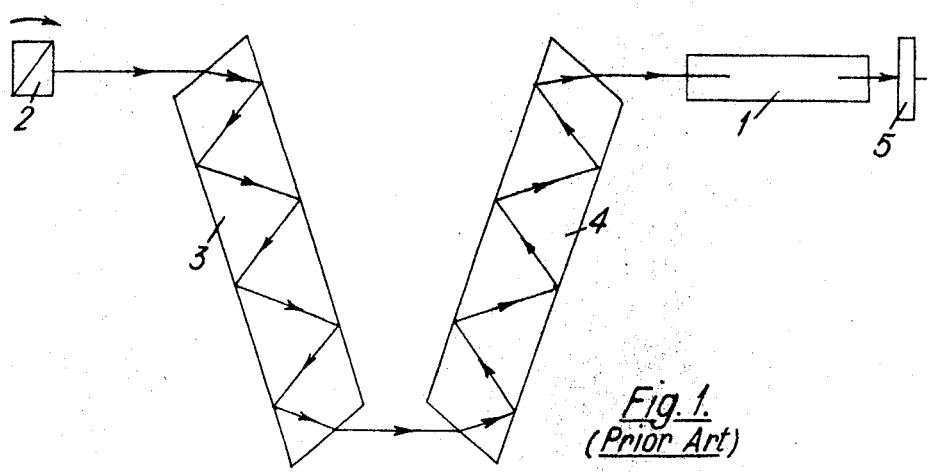
FIG. 1 represents a mode filter of a known type.

FIG. 1 represents a mode filter of a known type constituted by two Lummer-Gehrke plates referenced 3, 4 which are placed inside the interferometric cavity defined by the rotating prism 2 and the semitransparent mirror 5, the crystal being referenced 1. It is realized that these plates 3, 4 assure, due to their multiple reflections, an extremely critical alignment. In effect, since their angle is so adjusted that their reflections occur at an angle very slightly higher than the critical angle, the rays which are not parallel to the axis of the cavity strike the surface, after a few reflections, at an angle lower than the critical angle, and are thus ejected.

It will be realized that, if $n1$ and $n2$ designate the refraction indices of two transparent media ($n2 > n1$), the critical angle $\lambda$ is the incidence angle $i$ of a light ray, in the medium of index $n2$, on the separation surface of these media such as: $\sin\lambda = n1/n2$. For an incidence angle such as $i > \lambda$, refraction takes place, and for $i > \lambda$ a total reflection takes place on the separation surface of these two media.

Figure 2A:
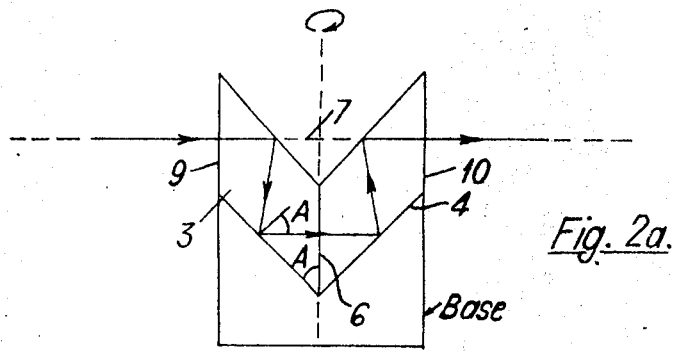
FIGS. 2a and 2b represent a first example of achievement of a mode filter according to the invention.
Figure 2B:
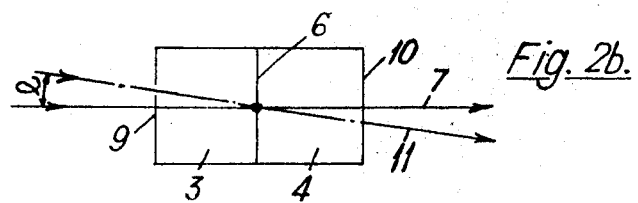

FIGS. 2a and 2b represent the side view and the upper view of a first embodiment of the monoblock mode filter according to the invention, in which the reflections take place, in the same way as in the preceding example, at an angle very slightly higher than the limit (critical) angle. The two plates 3, 4 are identical and are joined by the faces 6.

The value of the angle A depends upon the material used for making the plates, as well as upon the wavelength. Its difference, with respect to the critical angle, characterizes the efficiency of the system, the attenuation of the modes slightly oblique with respect to the axis 7 increasing when this difference decreases.

This composite piece, which may be called a critical transmission prism, may be made of various materials, such as silicon glass or Crown borosilicate which enables the obtaining of accurately cut elements.

The parameters required are obtained in a well known manner, by measurement and calculation. Thus, the refraction index nL for the wavelength λ L of the laser is obtained by the well known formula:

$$n_L = \frac{\frac{(\lambda_L-\lambda_1)(\lambda_2-\lambda_3)}{n_1}+\frac{(\lambda_L-\lambda_2)(\lambda_3-\lambda_1)}{n_2}+\frac{(\lambda_L-\lambda_3)(\lambda_1-\lambda_2)}{n_3}}{(\lambda_L-\lambda_1)(\lambda_2-\lambda_3)n_1+(\lambda_L-\lambda_2)(\lambda_3-\lambda_1)n_2+(\lambda_L-\lambda_3)(\lambda_1-\lambda_2)n_3} n_1 n_2 n_3$$

in which $n_1$, $n_2$, $n_3$ are the refraction indices of the plate measured for known wavelengths $\lambda_1$, $\lambda_2$, $\lambda_3$, which may be for instance the sodium line D, the hydrogen line C, and the potassium line A'.

Thus, for the Crown borosilicate glass B1664 and $\lambda L$=6943 A, one has $nL$=1,512224.

The critical angle for this wavelength is $\theta 1$=41°24'.

For a given type of laser, it has been observed that the multiple pulses were distant by at least 200 $ns$. It is thus necessary that the mode filter introduces a sufficient attenuation in order that the transmission of a pulse should be impossible for a time interval of 200 $ns$ with respect to the time of alignment.

If the prism rotates at 400 revolutions per second, a time interval of 200 $ns$ corresponds to a rotation of about 2 minutes of arc. The critical prism angle can then be taken equal to 41°24'$Az2'$ or A=41°26'.

In the critical transmission prism shown in figures 2a and 2b losses by reflection take place (approximately 4 percent over the input face 9 and output face 10 when the prism is not perfectly aligned, i.e. when the plane of the 41°. said prism makes an angle $\alpha$ (see figure 2b) of a value different from zero with respect to the axis of the cavity. That alignment of this prism in the cavity is thus relatively difficult.

Figure 3:
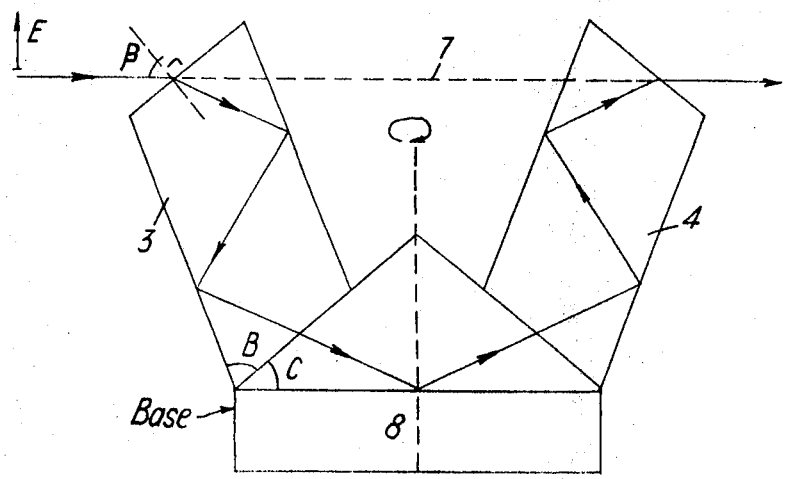
FIG. 3 represents a second example of achievement of a mode filter according to the invention.

FIG. 3 represents a second way of achieving the invention in which the rays enter and leave at an angle equal to the Brewster angle $\beta$, which cancels the reflection losses provided that the crystal used produces polarized light with an electrical vector E in the plane of the figure.

It is seen that this filter comprises two identical Lummer-Gehrke plates 3, 4 joined to the transparent faces of a prism 8.

It is seen that, as in the preceding example, the incoming and outgoing rays are colinear with the axis 7. The angles B and C are calculated in the same way as the angle A of FIG. 2 and, in the same conditions and with the same angle with respect to the critical angle, one has:

B=74°56'
C=33°30'

It will be noted that, in the optical blocks of FIGS. 2 and 3, the assembly cannot be made by glueing, since all glues absorb a slight part of the luminous energy, and are finally burnt. The assembly is thus made only by joining optical polished surfaces but the block is generally glued on a base plate.

I claim:

1. A critical transmission prism for receiving and transmitting radiation located in the interferometric cavity of a Q-switched laser comprising:
    a first parallelepipedic plate having a first face for receiving radiation and a first end;
    a second parallelepipedic plate having a second face for transmitting radiation and a second end;
    said first and second plates extending at an acute angle with respect to each other; and
    means for permanently, physically, and optically connecting said two plates at their ends to form a single compound prism,
        wherein the input and output faces are perpendicular to the axis of the cavity in a first plane and at the Brewster angle to the axis of the cavity in a second plane.

2. A critical transmission prism according to claim 1 wherein said two plates are directly joined one to the other at their ends.

3. A critical transmission prism, according to claim 2, wherein said end faces are optically polished pressure formed faces, further including; a base which is rotatable about an axis perpendicular to said base, said compound prism being attached to said base.

4. A critical transmission prism, according to claim 1, further including a second prism,
    said plates being joined at their ends to said prism.

5. A critical transmission prism, according to claim 4, wherein said end faces are optically polished pressure joined faces, further including;
    a base which is rotatable about an axis perpendicular to said base, said compound prism being attached to said base.